(12) United States Patent
Rao et al.

(10) Patent No.: US 11,132,557 B2
(45) Date of Patent: Sep. 28, 2021

(54) LOGO EXTRACTION DEVICE, AND BRIGHTNESS ADJUSTING METHOD AND DEVICE FOR LOGO

(71) Applicant: TCL CHINA STAR OPTOELECTRONICS TECHNOLOGY CO., LTD., Guangdong (CN)

(72) Inventors: Yang Rao, Guangdong (CN); Leli Peng, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/960,722

(22) PCT Filed: Jan. 10, 2020

(86) PCT No.: PCT/CN2020/071466
§ 371 (c)(1),
(2) Date: Jul. 8, 2020

(87) PCT Pub. No.: WO2021/128502
PCT Pub. Date: Jul. 1, 2021

(65) Prior Publication Data
US 2021/0201041 A1 Jul. 1, 2021

(30) Foreign Application Priority Data
Dec. 25, 2019 (CN) .......................... 201911356403.9

(51) Int. Cl.
*G06K 9/00* (2006.01)
*H04N 9/77* (2006.01)

(52) U.S. Cl.
CPC .......... *G06K 9/00744* (2013.01); *H04N 9/77* (2013.01)

(58) Field of Classification Search
CPC ..................... G06K 2209/25; H04N 21/44008
See application file for complete search history.

(56) References Cited

U.S. PATENT DOCUMENTS

| | | | |
|---|---|---|---|
| 2014/0047475 A1* | 2/2014 | Oh | H04N 21/8586 725/40 |
| 2015/0007217 A1* | 1/2015 | Wood | H04N 21/44008 725/32 |
| 2015/0046953 A1* | 2/2015 | Davidson | H04N 21/44008 725/74 |
| 2018/0146233 A1* | 5/2018 | Satheesh | H04N 21/44008 |
| 2018/0197042 A1* | 7/2018 | Porter | G06K 9/6202 |

\* cited by examiner

*Primary Examiner* — Paulos M Natnael

(57) ABSTRACT

The present application discloses a logo extraction device, and a brightness adjusting method and device for a logo. The logo extraction device includes an acquiring module, a gray-scale converting module, a weight processing module, and an extraction module. In the present application, by increasing a number of key frames in a process of logo extraction and using video frame weighting, the logo is extracted and thereby accuracy of logo extraction is improved.

9 Claims, 2 Drawing Sheets

LOGO EXTRACTION DEVICE, AND BRIGHTNESS ADJUSTING METHOD AND DEVICE FOR LOGO

FIELD OF INVENTION

The present application relates to a field of display technology, and more particularly to a logo extraction device, and a brightness adjusting method and device for a logo.

BACKGROUND

In image recognition and image analysis, feature point signals can usually describe characteristics and contour shapes of objects well. Extracting feature point signals is a very important technique in image processing, and it has been widely used in fields such as target recognition, target tracking, fingerprint recognition, etc.

Among them, extraction of logos is an item in image recognition and image analysis. Traditional logo extraction method is to extract areas of less variation in averaged gray-values (which are deemed as areas where logos are located) through extracting multi-frame image information and using a weighting method of video frames. However, due to limitations such as key frames, etc., an accuracy of logo extraction is low and an effect thereof is not good. Furthermore, a constant proportion of brightness attenuation is applied to the extracted logo areas, leading to poor effect of preventing afterimage.

Therefore, the existing technology has defects and needs to be improved urgently.

SUMMARY

The present application provides a logo extraction device, and a brightness adjusting method and device for a logo, which can solve technical problems such as low logo extraction accuracy and poor extraction effect of existing logo extraction method and device.

The present application provides a logo extraction device, comprising:

an acquiring module configured to acquire a continuous video image of preset frames during video playback and to acquire RGB values of pixels in each frame of the video image;

a gray-scale converting module configured to convert the RGB values into a V-channel model and to obtain corresponding gray-scale values, thereby determining a gray-scale image corresponding to each frame of the video image according to the gray-scale values of the pixels;

a weight processing module configured to perform weight calculation on the gray-scale values of the pixels in the gray-scale image of each frame of the video image and the gray-scale image of the previous frame of the video image, thereby performing weighting process to the gray-scale values of the pixels in each gray-scale image based on a weight value; and an extraction module configured to determine feature point information whose gray-scale value is less than a threshold value from the gray-scale image of the video image in the preset frame according to a preset algorithm, thereby using the feature point information to extract a logo from the video.

In the logo extraction device of the present application, the acquiring module is configured to acquire the RGB values of the pixels of a first N rows and M columns of each frame of the video image, wherein a value of N is one-fourth of a resolution in a vertical direction of the video, and a value of M is one-fourth of the resolution in a horizontal direction of the video, and N and M are both integers greater than 0.

In the logo extraction device of the present application, the weight processing module comprising a weight calculating sub-module and a weight processing sub-module;

wherein the weight calculating sub-module is configured to:

initialize a weight value prior to performing the weight calculation on the gray-scale values of the pixels in the gray-scale image of each frame of the video image; and perform weight calculation on the gray-scale values of the pixels in the gray-scale image of each frame of the video image and the gray-scale image of the previous frame of the video image, and update the weight value;

wherein the weight processing sub-module is configured to:

perform weight calculation on the gray-scale values of the pixels in the gray-scale image of each frame of the video image according to the weight value.

In the logo extraction device of the present application, the extraction module comprises a binarization processing sub-module and an extraction sub-module;

wherein the binarization processing sub-module is configured to:

binarize the gray-scale value of the weighting process, wherein the gray-scale value of the weighting process is greater than a first value assigned to the threshold value, and the gray-scale value of the weighting process is less than a second value assigned to the threshold value, thereby obtaining a binary graph;

wherein the extraction submodule is configured to:

determine feature point information whose gray-scale value after the weight processing is less than the threshold value according to the binary graph, and extract the logo based on the feature point information in the gray-scale image of the preset frame of the video image.

The present application further provides a brightness adjusting device for a logo, comprising:

a logo extraction unit configured to acquire a continuous video image of preset frames during video playback and to extract a logo from the video image of the preset frames;

a calculating unit configured to calculate a mean value of gray-scales of pixels in an area where the logo is located and a mean value of gray-scales of pixels of the video image respectively; and a brightness adjusting unit configured to adjust a brightness of the logo by using a first algorithm based on the mean value of the gray-scales of the pixels in the area where the logo is located and the mean value of the gray-scales of the pixels of the video image.

In the brightness adjusting device of the present application, the logo extraction unit comprises:

an acquiring module configured to acquire the continuous video image of preset frames during video playback and to acquire RGB values of pixels in each frame of the video image;

a gray-scale converting module configured to convert the RGB values into a V-channel model and to obtain corresponding gray-scale values, thereby determining a gray-scale image corresponding to each frame of the video image according to the gray-scale values of the pixels;

a weight processing module configured to perform weight calculation on the gray-scale values of the pixels in the gray-scale image of each frame of the video image and the gray-scale image of the previous frame of the video image, thereby performing weighting process to the gray-scale values of the pixels in each gray-scale image based on a weight value; and an extraction module configured to determine feature point information whose gray-scale value is less than a threshold value from the gray-scale image of the video image in the preset frame according to a preset algorithm, thereby using the feature point information to extract an logo from the video.

In the brightness adjusting device of the present application, the acquiring module is configured to acquire the RGB values of the pixels of a first N rows and M columns of each frame of the video image, wherein a value of N is one-fourth of a resolution in a vertical direction of the video, and a value of M is one-fourth of the resolution in a horizontal direction of the video, and N and M are both integers greater than 0.

In the brightness adjusting device of the present application, the extraction module comprises a binarization processing sub-module and an extraction sub-module;

wherein the binarization processing sub-module is configured to:

binarize the gray-scale value of the weighting process, wherein the gray-scale value of the weighting process is greater than a first value assigned to the threshold value, and the gray-scale value of the weighting process is less than a second value assigned to the threshold value, thereby obtaining a binary graph;

wherein the extraction submodule is configured to:

determine feature point information whose gray-scale value after the weight processing is less than the threshold value according to the binary graph, and extracting the logo based on the feature point information in the gray-scale image of the preset frame of the video image.

The present application further provides a brightness adjusting method for a logo, comprising following steps:

acquiring a continuous video image of preset frames and RGB values of pixels in each frame of the video image by an acquiring module during video playback;

converting the RGB values into a V-channel model by a gray-scale converting module, obtaining corresponding gray-scale values, thereby determining a gray-scale image corresponding to each frame of the video image according to the gray-scale values of the pixels;

performing weight calculation on the gray-scale values of the pixels in the gray-scale image of each frame of the video image and the gray-scale image of the previous frame of the video image, thereby performing weighting process to the gray-scale values of the pixels in each gray-scale image based on a weight value;

determining feature point information whose gray-scale value is less than a threshold value from the gray-scale image of the video image in the preset frame according to a preset algorithm by an extraction module, thereby using the feature point information to extract a logo from the video;

calculating a mean value of gray-scales of pixels in an area where the logo is located and a mean value of gray-scales of pixels of the video image by a calculating unit, respectively; and adjusting a brightness of the logo by using a first algorithm by a brightness adjusting unit based on the mean value of the gray-scales of the pixels in the area where the logo is located and the mean value of the gray-scales of the pixels of the video image.

In the method for adjusting a brightness of a logo of the present application, the step of adjusting the brightness of the logo comprises:

reducing the brightness of the logo by the brightness adjusting unit according to a brightness of the video image when the mean value of the gray-scales of the pixels of the video image is lower than the mean value of the gray-scales of the pixels of the area where the logo is located; or increasing the brightness of the logo by the brightness adjusting unit according to the brightness of the video image when the mean value of the gray-scales of the pixels of the video image is higher than the mean value of the gray-scales of the pixels of the area where the logo is located.

Image identification extraction devices, and brightness adjusting methods and devices for logo provided by the present application extract logos through increasing numbers of key frames in a process of extracting logos and using video-frame weighting to improve an accuracy of the logo extraction. In addition, according to the brightness of background areas (of the video image) near the logo, the brightness of the logo can be adjusted in real time, so that the brightness of the logo matches or is equivalent to the brightness of the video image, thereby effectively suppressing an afterimage phenomenon.

BRIEF DESCRIPTION OF DRAWINGS

To detailly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

Figure 1:
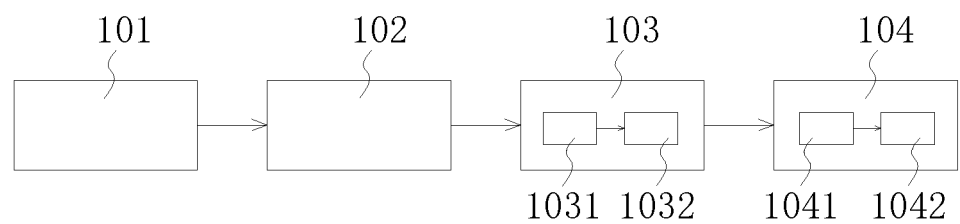
FIG. 1 is a schematic structural diagram of a logo extraction device provided by an embodiment of the present application.

The technical solutions in the embodiments of the present application will be described clearly and completely with reference to the drawings in the embodiments of the present application. Obviously, the described embodiments are only a part of the embodiments of the present application, but not all the embodiments. Based on the embodiments in the present application, all other embodiments obtained by those skilled in the art without making creative work fall within the protection scope of the present application.

In the description of this application, it should be understood that the terms "vertical", "horizontal", "length", "width", "upper", "lower", "front", "rear", "left", "right", etc. indicated orientation or positional relationship is based on the orientation or positional relationship shown in the drawings, only to facilitate the description of this application and simplify the description, not to indicate or imply the device referred to Or the element must have a specific orientation, be constructed and operated in a specific orientation, and therefore cannot be understood as a limitation of the present application. In addition, the terms "first" and "second" are used for descriptive purposes only, and cannot be understood as indicating or implying relative importance or implicitly indicating the number of technical features indicated. Thus, the features defined as "first" and "second" may explicitly or implicitly include one or more of the features. In the description of this application, the meaning of "a plurality of" is two or more, unless otherwise specifically limited.

The present application may repeat reference numerals and/or reference letters in different examples. Such repetition is for simplicity and clarity and does not itself indicate the relationship between the various embodiments and/or settings discussed.

An embodiment provides a logo extraction device. The logo extraction device may be specifically integrated in an electronic device such as a server or a terminal.

Herein, the electronic device acquires a continuous video image of preset frames during video playback, determines a gray-scale image of the video image corresponding to the frame, performs weight calculation on the gray-scale values of the pixels in the gray-scale image of each frame of the video image, and determines feature point information whose gray-scale value is less than a threshold value from the gray-scale image of the video image in the preset frame according to a preset algorithm, thereby using the feature point information to extract a logo from the video.

Specifically, please refer to FIG. 1. FIG. 1 specifically describes a logo extraction device according to an embodiment of the present application. The logo extraction device can be applied to an electronic device, and the electronic device may comprise mobile phones, tablet computers, personal computers (PCs), and other devices with image display functions. The logo extraction device may comprise an acquiring module 101, a gray-scale converting module 102, a weight processing module 103, and an extraction module 104, wherein:

the acquiring module 101 is configured to acquire a continuous video image of preset frames during video playback and to acquire RGB values of pixels in each frame of the video image.

In the present embodiment, acquiring a continuous video image of preset frames is arbitrarily selected from a video. A frame is a single image of the smallest unit in a video image, which is equivalent to each frame of a movie, and each frame is a still image. Rapidly displaying frames forms illusion of a moving video image.

In the present embodiment, the video image of each frame is acquired as a color image, and pixels of the video image are composed of three components of R/G/B, wherein R is red components of the color image, G is green components of the color image, and B is blue components of the color image. Each point is represented by three bytes R/G/B. R/G/B is usually divided into 256 levels from 0 to 255, wherein 0 is the darkest (all black) and 255 is the brightest (all white).

In one embodiment, if the extracted logo is a station logo (for example, a logo of a television station), and the logo is usually located in a fixed area in the video, therefore only a local area of the video is needed to be extracted. The acquiring module 101 acquires RGB values of the pixels of a first N rows and M columns of each frame of the video image, wherein a value of N is one-fourth of a resolution in a vertical direction of the video, and a value of M is one-fourth of the resolution in a horizontal direction of the video, and N and M are both integers greater than 0.

It can be understood that the vertical resolution of the video is the number of pixels in the column direction of the video, and the horizontal resolution of the video is the number of pixels in the row direction of the video.

The gray-scale converting module 102 is configured to convert the RGB values into a V-channel model and to obtain corresponding gray-scale values, thereby determining a gray-scale image of the video image corresponding to the frame according to the gray-scale values of the pixels.

Specifically, the gray-scale converting module 102 converts the RGB values from an RGB-channel model to the V-channel model of an HSV-channel model, and V values obtained are gray-scale values.

In the present embodiment, the RGB-channel model is an RGB color model being divided into three color channels of red (R), green (G), and blue (B), and the RGB component of each pixel in the image is assigned with an intensity value in the range of 0 to 255 by the RGB-channel model. The HSV-channel model is divided into intuitive color characteristics of three HSV modes comprising channel hue (H), saturation (S), and brightness (V). The gray-scale image of the video image of the corresponding frame determined according to the gray-scale values refers to an image containing only brightness information and no color information.

The gray-scale image in the gray-scale converting module 102 that determines the corresponding frame of the video image is a gray-scale image of each frame of the video image. In the present embodiment, it is necessary to traverse the position of each pixel, or traverse the position of each pixel in the specified areas, and then determine the gray-scale image of the video image of the preset frame.

The weight processing module 103 is configured to perform weight calculation on the gray-scale values of the pixels in the gray-scale image of each frame of the video image and the gray-scale image of the previous frame of the video image, thereby performing weighting process to the gray-scale values of the pixels in each gray-scale image based on a weight value.

The weight processing module 103 comprises a weight calculating sub-module 1031 and a weight processing sub-module 1032.

The weight calculating sub-module 1031 is configured to:

initialize a weight value, for example the weight value VW=0, prior to performing the weight calculation on the gray-scale values of the pixels in the gray-scale image of each frame of the video image; and perform weight calculation on the gray-scale values of the pixels in the gray-scale image of each frame of the video image according to the weight value and update the weight value.

For example, 1000 frames are selected as the key frames and the initial frame is defined as the first frame, and pixels of the $i^{th}$ frame (i is an integer greater than 0) of the video image in the first N rows and M columns are defined as $I_{NM}$, and weight value $V_{Wi}$ of the gray-scale value of the pixels $I_{NM}$ in the gray-scale image corresponding to the video image of the $i^{th}$ frame is calculated by a following calculation formula (1-1) which is:

$$V_{Wi}=(1-\alpha)V_{i-1}+\alpha V_i \quad (1\text{-}1)$$

wherein, $V_i$ is the gray-scale value of the pixels in the gray-scale image of the video image at frame i, and $V_{i-1}$ is the gray-scale value of the pixels in the gray-scale image of the video image at frame i−1, and a weight coefficient α=1/i, and α varies with the number of key frames, wherein i is greater than or equal to 1, and is less than 1000.

The weight processing sub-module 1032 is configured to:

perform weighting process on the gray-scale values of the pixels in the gray-scale image of each frame of the video image according to the weight values.

The extraction module 104 is configured to determine feature point information whose gray-scale value is less than a threshold value from the gray-scale image of the video image in the preset frame according to a preset algorithm, thereby using the feature point information to extract a logo from the video.

Wherein, the extraction module 104 comprises a binarization processing sub-module 1041 and an extraction sub-module 1042.

Herein, the binarization processing sub-module 1041 is configured to:

binarize the gray-scale value of the weighting process, wherein the gray-scale value of the weighting process is greater than a first value assigned to the threshold value $V_{th}$, and the gray-scale value of the weighting process is less than a second value assigned to the threshold value $V_{th}$, thereby obtaining a binary graph $V_{WBj}$.

For example, in the weighting process, the gray-scale value is greater than the threshold value $V_{th}$ and the assignment value is 255, and the gray-scale value is less than the threshold $Vt_h$ and the assignment value is 0.

Herein, the extraction sub-module 1042 is configured to:

determine feature point information whose gray-scale value after the weight processing is less than the threshold value according to the binary graph $V_{WBj}$, and extract the logo based on the feature point information in the gray-scale image of the preset frame of the video image.

The extraction sub-module 1042 extracts the logo A from the video according to the preset algorithm, and a formula (1-2) of the preset algorithm is:

$$A = I_{NM} \times (V_{WBi}/255) \qquad (1\text{-}2)$$

Thus, the logo A is extracted.

The calculating unit 20 is configured to calculate the mean value GB of the gray-scale of the incident point of the area where the image identifier A is located and the grayscale mean value GB of the corresponding point of the video image, respectively.

Wherein, the calculating unit 20 is configured to calculate a mean value $G_A$ of gray-scales of pixels in an area where the logo A is located and a mean value $G_B$ of gray-scales of pixels of the video image, respectively.

Wherein, the mean value $G_A$ of gray-scales and the mean value $G_B$ of gray-scales GB respectively calculate the mean value of the gray-scale of the points of the gray-scale image of the video image of each frame in the corresponding area. Taking the expected pixel $I_{NM}$ at the first N rows and M columns of the video image as an example, the mean value $G_A$ of gray-scales is the mean value of gray-scales of the pixels in the area where the logo A is located, and the mean value $G_B$ of gray-scales may also be the mean value of gray-scales of all pixels of the gray-scale images of one frame of the video image.

The brightness adjusting unit 30 is configured to adjust a brightness of the logo by using a first algorithm based on the mean value of the gray-scales $G_A$ of the pixels in the area where the logo is located and the mean value $G_B$ of the gray-scales of the pixels of the video image.

The letter L represents a brightness of the logo, and a formula (1-3) of the first algorithm is:

$$LA = I_{NM} \times (V_{WBi}/255) \times G_B/G_A \qquad (1\text{-}3)$$

Thus, the brightness adjustment value LA of the logo can be calculated from the mean value GA of the gray-scales of the pixels of the logo area and the grayscale mean value GB of the pixels of the video image.

When the mean value GB of the gray-scale of the video image is lower than the mean value GA of the gray-scale of the area where the logo is located, the brightness adjustment unit 30 reduces the brightness of the logo according to the brightness of the video image, or when the mean value GB of the gray-scale of the video image is greater than the mean value GA of the gray-scale of the area where the logo is located, the brightness adjustment unit 30 increases the brightness of the logo according to the brightness of the video image.

The brightness adjusting device for the logo provided by the present application can accurately extract the logo, and can instantly adjust the brightness of the logo according to the brightness of the background area (video image) near the logo at the same time, so that the brightness of the logo and the brightness of the video image can be compatible or equivalent to effectively suppress the afterimage phenomenon.

Figure 2:
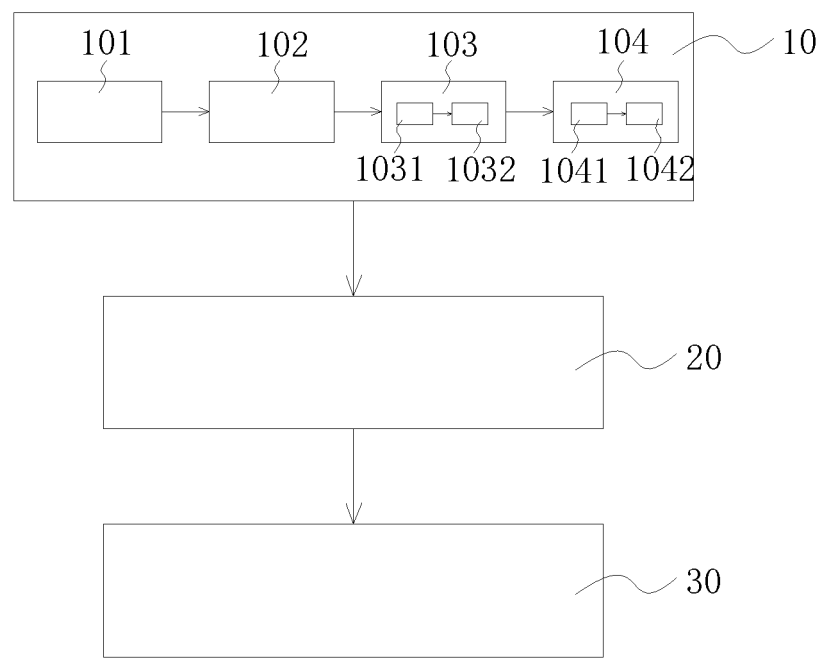
FIG. 2 is a schematic structural diagram of a brightness adjusting device for a logo provided by an embodiment of the present application.
Figure 3:
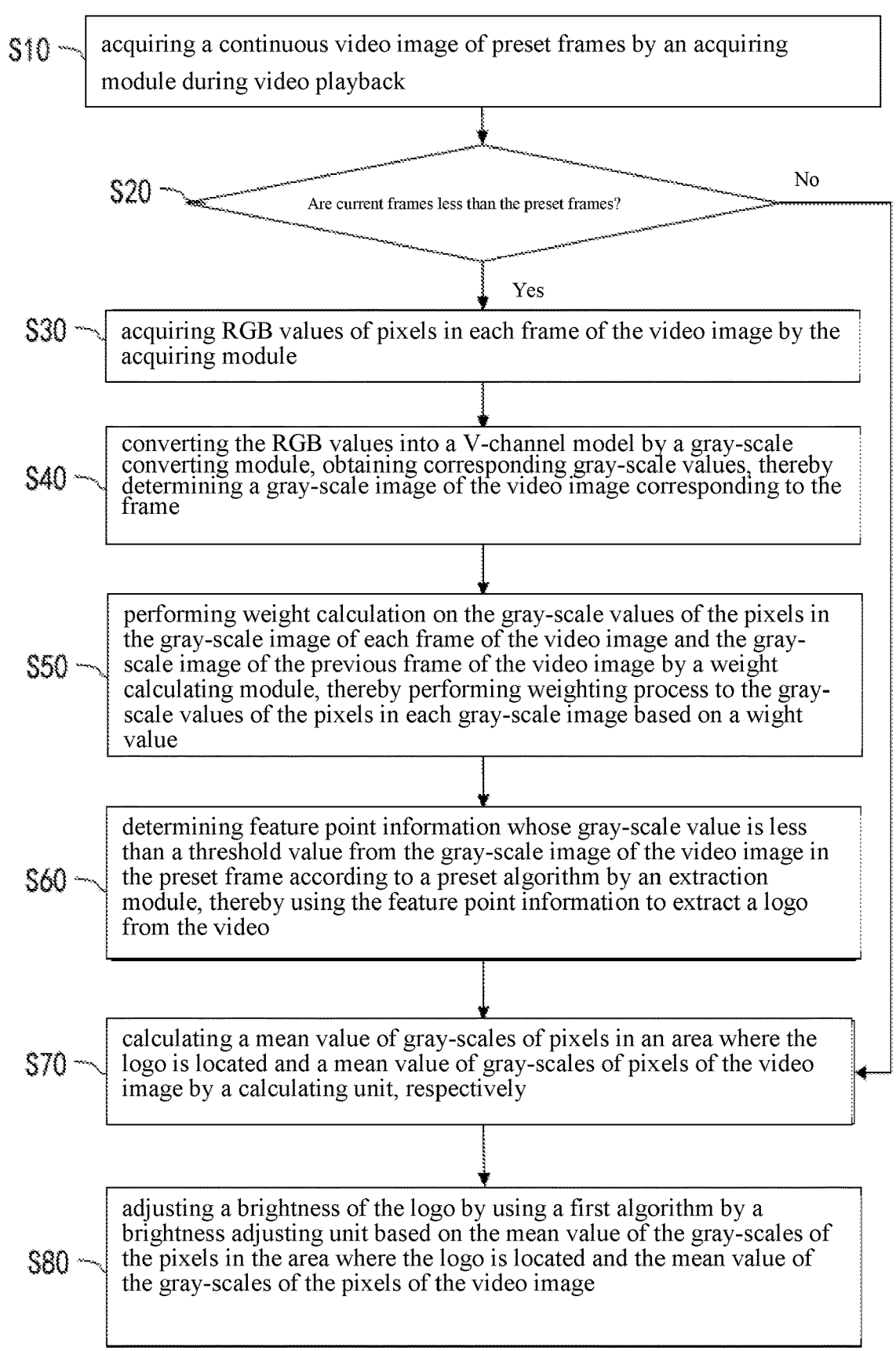
FIG. 3 is a flowchart of a brightness adjusting method for adjusting a brightness of a logo provided by an embodiment of the present application.

The application also provides a method for adjusting the brightness of the image logo by the brightness adjusting device of the image logo, please refer to FIG. 2 and FIG. 3, the method includes the following steps:

Step S10: acquiring a continuous video image of preset frames by an acquiring module 101 during video playback.

For example, the initial frame i=1, the number of key frames is 1000.

Step S20, determining whether a number of the current frames is less than the number of the preset frames;

If yes, performing step S30; otherwise, performing step S70.

Step S30, acquiring RGB values of pixels in each frame of the video image by the acquiring module 101.

Step S40: converting the RGB values into a V-channel model by a gray-scale converting module 102, and obtaining corresponding gray-scale values, thereby determining a gray-scale image of the video image corresponding to the frame.

Specifically, the gray scale converting module 102 converts the RGB values from the RGB-channel model to the V-channel model, and obtains the corresponding gray scale value.

Step S50: performing weight calculation on the gray-scale values of the pixels in the gray-scale image of each frame of the video image and the gray-scale image of the previous frame of the video image by a weight calculating module 103, thereby performing weighting process to the gray-scale values of the pixels in each gray-scale image based on a weight value.

Step S60: determining feature point information whose gray-scale value is less than a threshold value from the gray-scale image of the video image in the preset frame according to a preset algorithm by an extraction module S104, thereby using the feature point information to extract a logo from the video.

Step S70: calculating a mean value of gray-scales of pixels in an area where the logo is located and a mean value of gray-scales of pixels of the video image by a calculating unit 20, respectively.

Step S80: adjusting a brightness of the logo by using a first algorithm by a brightness adjusting unit 30 based on the mean value of the gray-scales of the pixels in the area where the logo is located and the mean value of the gray-scales of the pixels of the video image.

According to the above method, the brightness of the logo can be adapted to the brightness of the video image.

Wherein, the step of adjusting the brightness of the logo to adapt the brightness of the logo to the brightness of the video image comprises:

reducing the brightness of the logo by the brightness adjusting unit 30 according to the brightness of the video image when the mean value of the gray-scales of the video image is lower than the mean value of the gray-scales of the area where the logo is located; or increasing the brightness of the logo by the brightness adjusting unit 30 according to the brightness of the video image when the mean value of the gray-scales of the video image is higher than the mean value of the gray-scales of the area where the logo is located.

The brightness adjusting method for the logo provided by the present application can accurately extract the logo, and can instantly adjust the brightness of the logo according to the brightness of the background area (video image) near the logo so that the brightness of the logo and the brightness of the video image can be compatible or equivalent, thereby effectively suppressing the afterimage phenomenon.

In the above embodiments, the description of each embodiment has its own emphasis. For a part that is not detailed in an embodiment, you can refer to related descriptions in other embodiments.

The above describes a logo extraction device, and a brightness adjusting method and a device for a logo provided in the embodiments of the present application in detail, and specific examples have been used to explain the principles and implementations of the present application. The descriptions of the above embodiments are only used to help understand the technology of the present application, solutions and their core ideas; those of ordinary skill in the art should understand that they can still modify the technical solutions described in the foregoing embodiments or equivalently replace some of the technical features, and these modifications or replacements do not make the essence of the corresponding technical solutions deviate from the scope of the technical solutions of the embodiments of the present application.

What is claimed is:

1. A logo extraction device, comprising:
   an acquiring module configured to acquire a continuous video image of preset frames during video playback and to acquire RGB values of pixels in each frame of the video image;
   a gray-scale converting module configured to convert the RGB values into a V-channel model and to obtain corresponding gray-scale values, thereby determining a gray-scale image corresponding to each frame of the video image according to the gray-scale values of the pixels;
   a weight processing module configured to perform weight calculation on the gray-scale values of the pixels in the gray-scale image of each frame of the video image and a gray-scale image of a previous frame of the video image, thereby performing weighting process to the gray-scale values of the pixels in each gray-scale image based on a weight value; and
   an extraction module configured to determine feature point information whose gray-scale value is less than a threshold value from the gray-scale image of the video image in the preset frames according to a preset algorithm, thereby using the feature point information to extract a logo from the video.

2. The logo extraction device according to claim 1, wherein the acquiring module is configured to acquire the RGB values of the pixels of first N rows and M columns of each frame of the video image, wherein a value of N is one-fourth of a resolution in a vertical direction of the video, and a value of M is one-fourth of the resolution in a horizontal direction of the video, and N and M are both integers greater than 0.

3. The logo extraction device according to claim 1, wherein the weight processing module comprises a weight calculating sub-module and a weight processing sub-module;
   wherein the weight calculating sub-module is configured to:
   initialize the weight value prior to performing the weight calculation on the gray-scale values of the pixels in the gray-scale image of each frame of the video image; and
   perform the weight calculation on the gray-scale values of the pixels in the gray-scale image of each frame of the video image and the gray-scale image of the previous frame of the video image, and update the weight value;
   wherein the weight processing sub-module is configured to:
   perform weighting process on the gray-scale values of the pixels in the gray-scale image of each frame of the video image according to the weight value.

4. The logo extraction device according to claim 3, wherein the extraction module comprises a binarization processing sub-module and an extraction sub-module;
   wherein the binarization processing sub-module is configured to:
   binarize the gray-scale values of the weighting process, wherein the gray-scale values of the weighting process are greater than a first value assigned to the threshold value, and the gray-scale values of the weighting process are less than a second value assigned to the threshold value, thereby obtaining a binary graph;
   wherein the extraction sub-module is configured to:
   determine the feature point information whose gray-scale value after the weighting process is less than the threshold value according to the binary graph, and extract the logo based on the feature point information in the gray-scale image of the preset frames of the video image.

5. A brightness adjusting device for a logo, comprising:
   a logo extraction unit configured to acquire a continuous video image of preset frames during video playback and to extract the logo from the video image of the preset frames, wherein the logo extraction unit comprises:
   an acquiring module configured to acquire the continuous video image of the preset frames during the video playback and to acquire RGB values of pixels in each frame of the video image;
   a gray-scale converting module configured to convert the RGB values into a V-channel model and to obtain corresponding gray-scale values, thereby determining a gray-scale image corresponding to each frame of the video image according to the gray-scale values of the pixels;
   a weight processing module configured to perform weight calculation on the gray-scale values of the pixels in the gray-scale image of each frame of the video image and a gray-scale image of a previous frame of the video image, thereby performing weighting process to the gray-scale values of the pixels in each gray-scale image based on a weight value; and an extraction module configured to determine feature point information whose gray-scale value is less than a threshold value from the gray-scale image of the video image in the preset frame according to a preset algorithm, thereby using the feature point information to extract the logo from the video;

a calculating unit configured to calculate a mean value of gray-scales of pixels in an area where the logo is located and a mean value of gray-scales of pixels of the video image, respectively; and a brightness adjusting unit configured to adjust a brightness of the logo by using a first algorithm based on the mean value of the gray-scales of the pixels in the area where the logo is located and the mean value of the gray-scales of the pixels of the video image.

6. The brightness adjusting device according to claim 5, wherein the acquiring module is configured to acquire the RGB values of the pixels of first N rows and M columns of each frame of the video image, wherein a value of N is one-fourth of a resolution in a vertical direction of the video, and a value of M is one-fourth of the resolution in a horizontal direction of the video, and N and M are both integers greater than 0.

7. The brightness adjusting device according to claim 5, wherein the extraction module comprises a binarization processing sub-module and an extraction sub-module;

wherein the binarization processing sub-module is configured to:

binarize the gray-scale values of the weighting process, wherein the gray-scale values of the weighting process are greater than a first value assigned to the threshold value, and the gray-scale values of the weighting process are less than a second value assigned to the threshold value, thereby obtaining a binary graph;

wherein the extraction submodule is configured to:

determine the feature point information whose gray-scale value after the weighting process is less than the threshold value according to the binary graph, and extract the logo based on the feature point information in the gray-scale image of the preset frames of the video image.

8. A brightness adjusting method for a logo, comprising following steps:

acquiring a continuous video image of preset frames and RGB values of pixels in each frame of the video image by an acquiring module during video playback;

converting the RGB values into a V-channel model by a gray-scale converting module, obtaining corresponding gray-scale values, thereby determining a gray-scale image corresponding to each frame of the video image according to the gray-scale values of the pixels;

performing weight calculation on the gray-scale values of the pixels in the gray-scale image of each frame of the video image and the gray-scale image of the previous frame of the video image, thereby performing weighting process to the gray-scale values of the pixels in each gray-scale image based on a weight value;

determining feature point information whose gray-scale value is less than a threshold value from the gray-scale image of the video image in the preset frames according to a preset algorithm by an extraction module, thereby using the feature point information to extract the logo from the video;

calculating a mean value of gray-scales of pixels in an area where the logo is located and a mean value of gray-scales of pixels of the video image by a calculating unit, respectively; and adjusting a brightness of the logo by using a first algorithm by a brightness adjusting unit based on the mean value of the gray-scales of the pixels in the area where the logo is located and the mean value of the gray-scales of the pixels of the video image.

9. The brightness adjusting method according to claim 8, wherein the step of adjusting the brightness of the logo comprises:

reducing the brightness of the logo by the brightness adjusting unit according to a brightness of the video image when the mean value of the gray-scales of the pixels of the video image is lower than the mean value of the gray-scales of the pixels of the area where the logo is located; or increasing the brightness of the logo by the brightness adjusting unit according to the brightness of the video image when the mean value of the gray-scales of the pixels of the video image is higher than the mean value of the gray-scales of the pixels of the area where the logo is located.

* * * * *